Nov. 2, 1943.　　　　G. A. MOORE　　　　2,333,330
CONTAINER AND METHOD OF MANUFACTURE
Filed Jan. 7, 1941
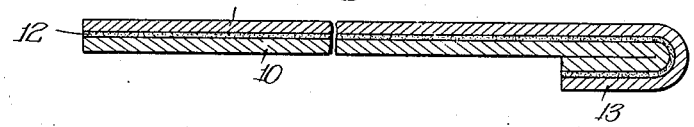
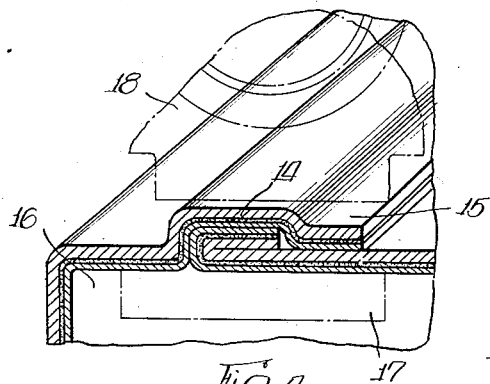
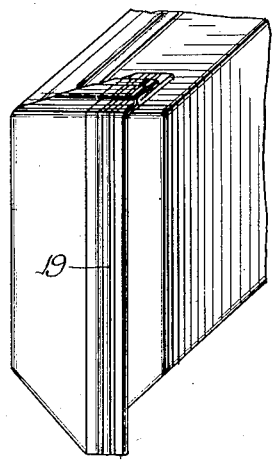
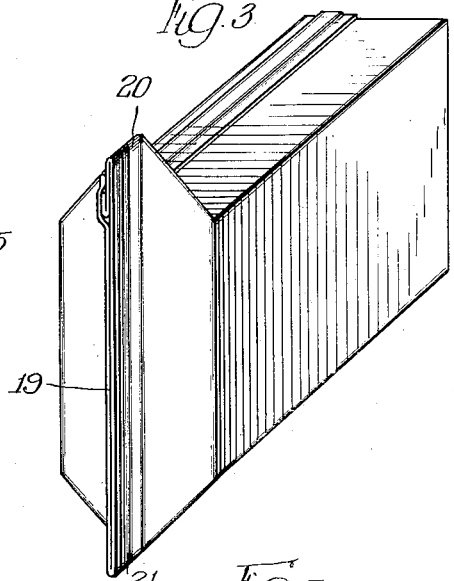
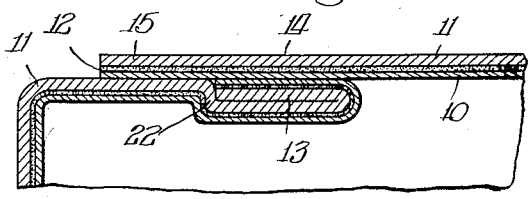
INVENTOR.
George Arlington Moore,
BY
Cromwell, Greist + Warden
attys Patented Nov. 2, 1943

2,333,330

UNITED STATES PATENT OFFICE 2,333,330

CONTAINER AND METHOD OF MANUFACTURE

George Arlington Moore, New York, N. Y.

Application January 7, 1941, Serial No. 373,458

5 Claims. (Cl. 93—35)

The present invention relates to an improved type of container for the packaging of products such as liquid and granular materials, and has particular reference to the provision of a hermetically sealed container from laminated materials composed of a thermoplastic sheet and a strength-imparting sheet of paper or the like.

A principal object of the invention is the provision of a container of the type described in which the body portion of the container is produced by laminating a sheet of transparent rubber hydrochloride to a sheet of paper, folding one edge portion of the resulting laminated sheet over so as to provide a paper-to-paper interface, folding the opposite edge of the laminated sheet over in overlapping relation with respect to the resulting marginal bead so as to provide an interface of rubber hydrochloride-to-rubber hydrochloride and an extension therebeyond, and sealing said interface together by the application of heat and pressure as well as sealing the extension therebeyond to the paper exterior of the container body.

Another object of the invention is to provide a laminated container body having an inner preformed thermoplastic film composed of a material such as transparent rubber hydrochloride and an outer protective sheet composed of a material such as paper, there being provided a longitudinally exending seam formed by folding a marginal edge of the combined sheet outwardly to expose a section of rubber hydrochloride, overlapping the opposite edge of the combined sheet with respect to the turned-over marginal edge to provide an end extension beyond the turned-over marginal edge, and heat-sealing the seam and extension.

These and other objects will be evident upon a consideration of the following description of a preferred embodiment of the invention and by reference to the accompanying drawing, in which Fig. 1 is an end view of a blank from which the body portion of the container is formed, with the marginal section folded over;

Fig. 2 is an end view showing the formation of the blank of Fig. 1 into a container body having the desired type of longitudinally extending seam;

Fig. 3 is a perspective view showing the sealing of an end portion of the body member formed in accordance with Fig. 2;

Fig. 4 shows the method of folding the end seal adjacent the end of the body portion; and Fig. 5 is a view similar to Fig. 2 showing a modified form of the longitudinal seal.

In the production of hermetically sealed containers considerable difficulty is encountered in obtaining the desired gas-impervious and liquid-impervious seam structure. In accordance with the present invention there is provided a container which is hermetically sealed in a simple manner and provided with a longitudinally extending body seam of improved type.

The body portion of the container is produced from a composite sheet made by laminating a sheet 10 of paper to a sheet 11 of transparent rubber hydrochloride material of the type known on the market as "Pliofilm," a suitable non-hardening adhesive indicated at 12 preferably being utilized for securing the two sheets together. The Pliofilm or transparent rubber hydrochloride is highly resistant to the passage therethrough of gases and liquids and may be of any suitable thickness. The nature of the paper itself will vary in use of the package for different purposes. A laminating adhesive which has proven to be satisfactory consists of a solution of rubber hydrochloride in a suitable solvent. Plasticizers of various kinds may be utilized.

After lamination of the preformed pellicle of rubber hydrochloride to the paper a marginal portion shown at 13 is folded over to provide a paper-to-paper interface. The width of the turned-over marginal portion 13 will depend upon such factors as the size of the package that is to be formed. After folding over the marginal portion in the manner shown, the opposite edge of the composite sheet is folded over in overlapped relation with respect to the marginal section 13 to provide a sealing section 14 having a Pliofilm-to-Pliofilm interface and an end extension 15 which contacts the paper exterior of the resulting tube or body portion of the container beyond the sealing section.

In seams of hermetically sealed packages known heretofore the two opposite edges of the body-forming material have been substantially coextensive, and in use this type of seam has been unsatisfactory. The improved seam provided by the construction shown in Fig. 2 provides an adequate gas type seam at the interface between the overlapped portions of the transparent rubber hydrochloride and, additionally, the seam is provided with protection by anchoring the end extension 15 to the paper exterior of the body member beyond the longitudinal seam.

It is preferred that the overlapping of the end sections of the composite blank from which the body portion is produced be brought about around a mandrel such as indicated at 16 in Fig. 2. This mandrel is provided with a resilient section 17 adjacent the longitudinally extending seam. After the end sections of the blank are folded into the positions shown in Fig. 2 a heat-sealing element indicated at 18 is pressed down against the overlapped sections to seal the Pliofilm-to-Pliofilm interface adjacent the marginal portions 13 and the section 14, thereby providing a hermetically sealed seam. Also, the compressibility of the member 17 allows the hot iron 18 to press the end extension 15 downwardly against the outer surface of the paper 11 and to adhere the transparent rubber hydrochloride of the end extension to the outer paper layer. This provides a closure and strength-imparting brace or anchor for the longitudinally extending seam. Thus, the longitudinally extending seam by which the body portion is formed includes an interface of the preformed thermoplastic inner pellicle and an anchoring end extension having a contact between the thermoplastic pellicle and the outer paper, these various elements being heat-sealed together into a composite structure in which the end extension 15 serves to retain the sealed portions adjacent the side of the container and to protect them.

The body portion formed in the manner shown in Fig. 2 then is sealed at its end portions in the manner shown in Fig. 3. That is, the end extensions of the body portion are brought together to provide a continuous interface of transparent rubber hydrochloride and the opposite sections are united together under heat and pressure to provide an integral hermetic seal and an end tab 19 having the ears 20 and 21. The end sealing operation is followed by bending the sealed edge 19 over against the end of the body portion. The ears 20 and 21 then are folded over adjacent the sides of the container as shown in Fig. 4.

It will be understood that after one of the ends of the body portion is formed in the manner described, the container is filled with a liquid or granular product such as coffee and thereafter the opposite end may be sealed in the same way.

In the embodiment of the invention shown in Fig. 5 the initially folded marginal section of the blank is provided with a downwardly extending portion 22 which allows the folded-over margin 13 to be in substantially the same plane as the plane of the body portion of the container. That is, the outer face of the turned-over margin 13 is substantially continuous with the outer face of the paper 11. In this modification of the invention the opposite edge of the blank provides a longitudinal seam in which the end extension 15 is substantially continuous with the sealing section 14. After the two end sections are overlapped in the manner shown in Fig. 5, heat and pressure are provided to seal the margin 13 to the section 14 and to secure the end extension 15 to the protective paper sheet 11. This embodiment of the invention is of the nature disclosed in my copending application Serial No. 177,176, filed November 30, 1937, of which the present application is a continuation in part. The depression of the shoulder 22 may be obtained by utilizing a mandrel shaped with a similar depression.

It will be recognized that many changes may be made in the invention as shown and described herein without departing from the scope of the claims. For instance, the outer protective material may vary quite widely in its characteristics. The inner material has been specified as being constructed of preformed transparent rubber hydrochloride, although it will be seen that other thermoplastic layers or pellicles may be formed into a container in which the longitudinal seam is produced in the manner referred to herein.

I claim:

1. The method of forming a container, which comprises laminating an outer fibrous body member to an inner non-fibrous, impervious liner having thermoplastically adhesive portions at least adjacent the edges thereof, folding over a longitudinal edge of the resulting blank upon itself with a thermoplastic adhesive portion of said liner exposed exteriorly of the blank, folding said blank into tubular form with the opposite longitudinal edge covering said folded edge to provide contact between thermoplastically adhesive portions of said liner and extending therebeyond in contact with the exterior of said blank to provide contact between the extended portion of the liner and said fibrous body member, and sealing said contacting parts by a procedure including the use of heat and pressure.

2. The method of forming a container, which comprises forming a blank by laminating a fibrous body member to a non-fibrous impervious body member having thermoplastic portions at least at the margins thereof, folding a longitudinal edge portion of said blank over with said fibrous body member constituting the inner layers of the fold and said impervious member constituting the outer layers thereof, folding said blank into tubular form with the opposite longitudinal edge thereof covering said folded edge to provide contact between two thermoplastically adhesive portions of said impervious body member and extending beyond said folded edge in contact with said blank to provide contact between the extended portion of said impervious member and said fibrous body member, and securing said contacting parts together by heat and pressure.

3. The method of forming a container, which comprises laminating an outer protective fibrous body member to an inner pellicle of thermoplastic rubber hydrochloride, folding over an edge of the resulting blank over upon itself with a portion of said rubber hydrochloride being exposed exteriorly of the blank, folding an opposite marginal portion of said blank into tubular form in overlapping relation with said edge to provide contact between portions of said rubber hydrochloride and with said marginal portion extending therebeyond in contact with the exterior of said blank, and heat-sealing said marginal portion to said edge and to the exterior of said blank.

4. A container, comprising an outer protective sheet and an inner thermoplastic, gas-resistant pellicle secured thereto to form a tubular body member, one edge of said body member being folded outwardly upon itself, and the opposite edge of said body member being folded over in overlapping relation to said edge, with an end extending therebeyond, and said opposite edge being thermally sealed to said one edge and to said outer protective sheet beyond said one edge.

5. A container, comprising a sheet of paper laminated to a sheet of thermoplastic rubber hydrochloride to form a tubular body member, one marginal portion of said body member being folded over upon itself to produce paper-to-paper contact and to provide an exterior rubber hydrochloride edge, the opposite marginal portion being folded in overlapped relation with respect to said edge and extending therebeyond, and said opposite marginal portion being thermally adhered to said edge and to said paper beyond said edge.

GEORGE ARLINGTON MOORE.